United States Patent [19]

Forrest

[11] Patent Number: 5,248,437
[45] Date of Patent: Sep. 28, 1993

[54] METHOD FOR THE MAGNETIC INHIBITION OF PROTISTA

[75] Inventor: Lindsay W. Forrest, Lower Hutt, New Zealand

[73] Assignee: Forrest Scientific Research Limited, Wellington, New Zealand

[21] Appl. No.: 630,060

[22] Filed: Dec. 19, 1990

Related U.S. Application Data

[63] Continuation-in-part of Ser. No. 430,960, Nov. 19, 1989, Pat. No. 5,055,188, which is a continuation of Ser. No. 122,873, Nov. 19, 1987, abandoned.

[30] Foreign Application Priority Data

Dec. 19, 1989 [NZ] New Zealand ............... 231876

[51] Int. Cl.⁵ .................... A23C 3/00; A61L 2/02
[52] U.S. Cl. ...................... 210/695; 422/22; 426/237
[58] Field of Search ............. 210/695; 426/237; 422/22, 23

[56] References Cited

U.S. PATENT DOCUMENTS

| | | |
|---|---|---|
| 2,652,925 | 8/1949 | Vermeiren . |
| 3,060,339 | 10/1962 | Moriga . |
| 3,355,024 | 11/1967 | Skoyles et al. . |
| 4,026,805 | 5/1977 | Fowler . |
| 4,066,544 | 1/1978 | Stark ................ 422/22 |
| 4,372,852 | 2/1983 | Kovacs . |
| 4,414,951 | 11/1983 | Saneto . |
| 4,428,837 | 1/1984 | Kronenberg . |
| 4,524,079 | 6/1985 | Hofmann ............ 422/22 |

FOREIGN PATENT DOCUMENTS

| | | |
|---|---|---|
| 110109 | 4/1940 | Australia .............. 426/237 |
| 32806 | 4/1985 | Austria . |
| WO84/04294 | 11/1984 | Fed. Rep. of Germany . |
| 62-180792 | 8/1987 | Japan . |
| 2-57473 | 10/1989 | Japan ................ 426/237 |
| 94917 | 3/1951 | New Zealand . |
| 182685 | 8/1980 | New Zealand . |
| 191716 | 11/1983 | New Zealand . |
| WO85/02094 | 5/1985 | PCT Int'l Appl. . |
| 148904 | 2/1955 | Sweden . |
| 1313811 | 5/1987 | U.S.S.R. . |
| 713161 | 8/1954 | United Kingdom . |

OTHER PUBLICATIONS

"Diesel Eating Bug Bitten Back", Trucking, Feb. 1986, pp. 6-7.
"Fighting The Diesel Bug", Power Boat; Feb. 1986, p. 15.
"Invention Takes Off", New Zealand Herald, Feb. 1986.
"Kiwi Firm Finds Way to Beat Diesel Bug", Auckland Star, Feb. 1986.
"Northcote Couple's Invention Cleans Up Diesel Fuel", Northshore Times, Feb. 1986.

*Primary Examiner*—Joye L. Woodard
*Attorney, Agent, or Firm*—Jacobson, Price, Holman & Stern

[57] ABSTRACT

A method of inhibiting protista in or on a fluid medium using magnetic fields by passing the medium through a plurality of magnetic fields produced by magnets (5a, 5b, 5c), of field strength up to 4000 gauss in rapid succession for at least 1 second. Adjacent fields of the plurality of fields are of opposite polarity. Milk, milk products, and fuels are examples of the media to which the method is applicable.

11 Claims, 8 Drawing Sheets

→ DIRECTION OF FLOW

∩ MAGNETIC FLUX PATTERNS

METHOD FOR THE MAGNETIC INHIBITION OF PROTISTA

CROSS REFERENCE TO RELATED APPLICATIONS

This application is a continuation-in-part out of application Ser. No. 07/430,960 filed Nov. 1, 1989, now U.S. Pat. No. 5,055,188, which in turn was a continuation of application Ser. No. 07/122,873 filed 19 Nov. 1987, now abandoned.

BACKGROUND OF THE INVENTION

This invention relates to a method of inhibiting the growth of protista by passing media containing the protista through a magnetic field. The field is of selected intensity and orientation to disrupt the cellular and sub-cellular processes of the protista to the extent that the desired inhibition is achieved. The invention also relates to apparatus for use in the method.

In this specification the term "protista" includes all monera fungi, bacteria, cyanobacteria, protozoa and other unicellular microorganisms. The media to which the method is applicable includes liquids, solids, particulate materials, syrups, emulsions, slurries, sludges, vapors and gases capable of supporting or containing the protista. Milk, fuels, milk products, semen and blood are particularly contemplated.

Protista are usually rapidly multiplying organisms and their presence in various systems is a problem of significant proportion. This is particularly the case with foodstuffs, drinks and medical equipment. Also there is, worldwide, a considerable problem of protistal growth in industrial solutions, including water and hydrocarbon fuels. The infestation of a fuel system decreases the efficiency of the fuel system, occasionally to such a point that a complete breakdown of machinery occurs.

Attempts have been made to control the grow of protista in fuels and water using biocides but the biocides themselves may adversely affect the performance of the fuel. Also biocides do not deal with the problem of accumulation of dead growths. Further, as is disclosed in Japanese patent application No. 62/180792, problems occur in the chemical treatment of water; namely that chemicals render the water unpleasant to taste, and filters such as charcoal filters themselves constitute breeding grounds for protista.

Various types of magnetic devices for treating water and fuels are known and some are disclosed in the following patent specifications: Russian 1313811; U.S. Pat. No. 4,716,024; U.S. Pat. No. 4,519,919; U.S. Pat. No. 4,469,076; U.S. Pat. No. 4,414,951; U.S. Pat. No. 4,538,582; U.S. Pat. No. 4,460,516; U.S. Pat. No. 4,381,754; U.S. Pat. No. 4,428,837; U.S. Pat. No. 3,060,339; U.S. Pat. No. 4,026,805; U.S. Pat. No. 4,372,852; U.S. Pat. No. 4,568,901; NZ 191716; NZ 94971; Swedish 148904; WO84/03539 and WO85/04893. However, none of these discloses a method of inhibiting protista and there is no suggestion that these devices could be used to inhibit protista. These known devices are used to condition fuels to improve fuel efficiency and to remove inorganic impurities from water or fuels.

One attempt to inhibit the growth of bacteria and algae in water using a magnetic field is disclosed in U.S. Pat. No. 4,065,386. Here the water to be treated is passed through a device in which a magnetic field is generated transverse the direction of flow of the water. The device includes a stack of aligned, annular magnets arranged with the axis of the stack perpendicular to the direction of flow of the water. Also suggested is the use of a magnet surrounding a water duct. The device is intended for use in conjunction with swimming pool filters and chlorites.

The device does seem to inhibit algae but is not particularly effective since some chemical treatment of the water is required. Also the patent teaches that the device treats the water, not the algae, to make the water hostile to the algae. Therefore there is no suggestion that the device could be used to inhibit algae in other media or in fact that other organisms could be inhibited.

The applicants' European patent specification 0 268 475 discloses a method of treating protista in distillates by passing the distillate though a magnetic field. Also disclosed are various devices in which the distillate may be treated. The method and devices disclosed in this document have been used successfully in the treatment of distillates. However the applicant has now discovered that the effectiveness of the method and the devices can be improved if the magnetic fields are arranged in a specific manner, magnetic fields of selected strengths are used, and the residence time of the medium in the field is over a specified minimum. Also, at the time of making the earlier application, the applicant believed that the devices treated the distillates, not the protista. Therefore there is no suggestion that the devices could be used to inhibit protista in other media.

Protistal infestation of milk is another problem worldwide. Spoilage of milk through infestation annually causes losses of millions of dollars. Attempts to alleviate the problem by traditional methods such as pasteurisation have not proved completely satisfactory.

Typically, traditional procedures such as pasteurisation are carried out at a central location after collection from the farm or other milk supply source. This causes a delay between milking and treatment during which the untreated milk is at risk of infestation. High costs are associated with the bulk treatment of milk, having regard to capital expenditure and running costs.

Similar problems occur with many other liquids, gases and solids.

SUMMARY OF THE INVENTION

Accordingly it is an object of this invention to provide a method of inhibiting protista in media, using magnetic fields, that is relatively inexpensive and effective. It is also an object to provide a device to inhibit protista in media that is relatively simple to install, easy to maintain, has low maintenance and running costs and is more effective than the devices known to the applicant.

The applicants have now discovered that protista are particularly susceptible to inhibition using magnetic fields of selected strengths, substantially independent of the media in or upon which the protista exist.

According to this invention there is provided a method of inhibiting protista in or on a medium comprising subjecting the medium to a plurality of magnetic fields of field strength up to 4000 gauss in rapid succession for at least 1 second, at least one pair of adjacent fields being of different strengths or preferably of opposite polarity.

Preferably, the medium has fluid properties. Then the magnetic fields may be provided by a plurality of magnets arranged in sequence with the north pole on one magnet facing the south pole of an adjacent magnet. The medium passes between each pair of adjacent magnets in succession. The medium is preferably subjected to turbulent flow conditions while passing between adjacent pairs of magnets.

In some applications, the field strengths are preferably less than 1200 gauss and more preferably are in the range 20 to 200 gauss.

The medium may be subjected to the magnetic fields for a time in the range 1 second to 200 seconds. In some applications this may be reduced to a period in the range of 5 seconds to 150 seconds and preferably a period in the range of 10 seconds to 100 seconds.

Preferably, the medium travels though the magnetic fields for a distance of at least about 0.5 m.

The invention also provides an apparatus for carrying out the method. The apparatus comprises:

a housing having an inlet and an outlet;

a plurality of aligned, platelike magnets arranged in the housing, each magnet having a maximum field strength of up to 4000 gauss, the magnets being spaced from one another and arranged such that the north pole face of one magnet faces the south pole face of an adjacent magnetic; and flow direction means to direct flow entering the housing around each magnet in the stack and between each pair of adjacent magnets.

In one embodiment, the inlet is connected to the bore of a support tube upon which the stack of magnets is arranged, the support tube being made of substantially unmagnetisable material. Then, the flow direction means is arranged so that the medium flows around the outer edges of one magnet and between the next magnet and support tube. Preferably, the apparatus has three magnets in the stack.

The flow direction means may comprise a seal between the magnet at one end of the stack and the support tube, a seal between the central magnet and the housing, and a seal between the magnet at the other end of the stack and the support tube.

In another preferred embodiment, at least one of the magnets has a bore through its center; medium flowing around a preceding magnet passing through the bore. Preferably, each magnet has a bore through its center and spacer means, having a bore seal, are provided to separate adjacent magnets and to seal the bore of one of the magnets. Also, a spacer means may have a tubular seal to engage about the magnet that has a clear bore to create a seal between the magnet and the housing. Again the apparatus preferably has three magnets in the stack.

The apparatus may have magnets that each provide a field strength of less than 1200 gauss and preferably a field strength in the range 200 to 1200 gauss.

Preferably, the housing is made of substantially unmagnetizable material. The flow path from one end of the magnets to the other is preferably at least 0.5 m.

The apparatus may also comprise a plurality of stacks of aligned, platelike magnets.

The applicant has surprisingly discovered that there is a maximum effective field strength for protistal inhibition. Fields over the maximum tend to have an enhancing effect on protistal growth rates. The optimum field strength varies with the type of organism used but field strengths over 4000 gauss offer no advantages.

The applicants have also discovered that the sinuous winding passage in and out from between the opposing faces of the magnets subjects protista to a violent buffeting of magnetic forces. It is believed that the fields attack the cells from a wide variety of angles sufficient to so affect the cell components and processes of any organism, that the organism is inhibited.

It is to be understood that relative movement between the medium and the magnetic field is contemplated and the requirements of the method are met by moving the magnetic field about the medium rather than moving the medium. This can be accomplished by passing the medium along a conveyor means, while the magnetic field is moved in a counter-current direction. Further, rotation of the field generation means about the medium, which may be moving, (for example by means of a conveyor) will result in an inhibitory effect.

The method and the apparatus have the advantage that they need not be employed just prior to use of the medium undergoing treatment. For example, many of the patent specifications mentioned above in relation to the treatment of fuels provide that the treatment is to occur between the fuel storage system and induction into an internal combustion engine. By contrast, the applicants' apparatus, while it may also be used in such a fashion, may be used in an independent recirculating system separate from the standard recirculation system of the medium.

For maximum beneficial effect, apparatus may be positioned in several places; for example at the inlet to a storage system, in the storage system, and again at the outlet of the storage system.

Fuel passed through the apparatus produces, upon combustion, significantly lower levels of hydrocarbons (unspent fuel) and carbon monoxide in exhaust emissions than untreated fuel. Tests on diesel fuels revealed up to a 80% reduction in hydrocarbon levels, and up to a 38% reduction in carbon monoxide levels in emissions.

The invention provides the additional advantage that substantial lysis of the protista occurs hence debris is reduced in size and therefore filters are not required. Many of the prior art devices require the use of additional physical filters, typically of a mesh or other "sieve-like" nature. Also Japanese patent application No. 62/180792 teaches that a build-up of slime or algae on the magnetic components of the device occurs. However the applicants, apparatus does not require the use of additional filters and algae build-up is substantially avoided. In particular, in the treatment of fuels, the apparatus causes physical destruction of suspended solids to such an extent that the debris can freely pass through normal engine filter elements, and be burned in an internal combustion engine without difficulty.

The applicants have also determined that the temperature of the medium containing the protista is relevant to efficacy of control, and is species related. Protista seem most vulnerable to the inhibitory effect of the field during division. This occurs more rapidly as the temperature rises from ambient to a species optimum. At raised temperatures therefore, the apparatus and the method may be more efficient, despite an apparent optimizing of growth conditions for the protista. The faster each generation of cells divide, the greater is their vulnerability to inhibition by the field effect. The appropriate temperature will be readily determinable by one skilled in the art.

In the treatment of milk, the advantage of the method and apparatus may be obtained by treatment at a variety of stages in the collecting and processing of milk. It is suggested that the apparatus should be installed in the milk flow lines at the milking station to provide an initial treatment immediately after milking. Storage tanks or containment means at the farm could contain recirculating pump systems using the applicants' apparatus.

On transfer to the collection tanker, further treatment may take place, and within the tanks further recirculation through the applicants, apparatus would ensure protistal inhibition.

Further treatment may occur on pumping out of the tankers and during the processing at a bulk plant, and prior to bottling or end use.

That is, each time the milk is moved, it may be moved through the apparatus and cheaply and without other side effects treated to ensure protistal inhibition.

BRIEF DESCRIPTION OF THE DRAWINGS

Embodiments of the invention are now described, by way of example only, with reference to the accompanying drawings wherein.

DETAILED DESCRIPTION OF THE INVENTION

Figure 1:
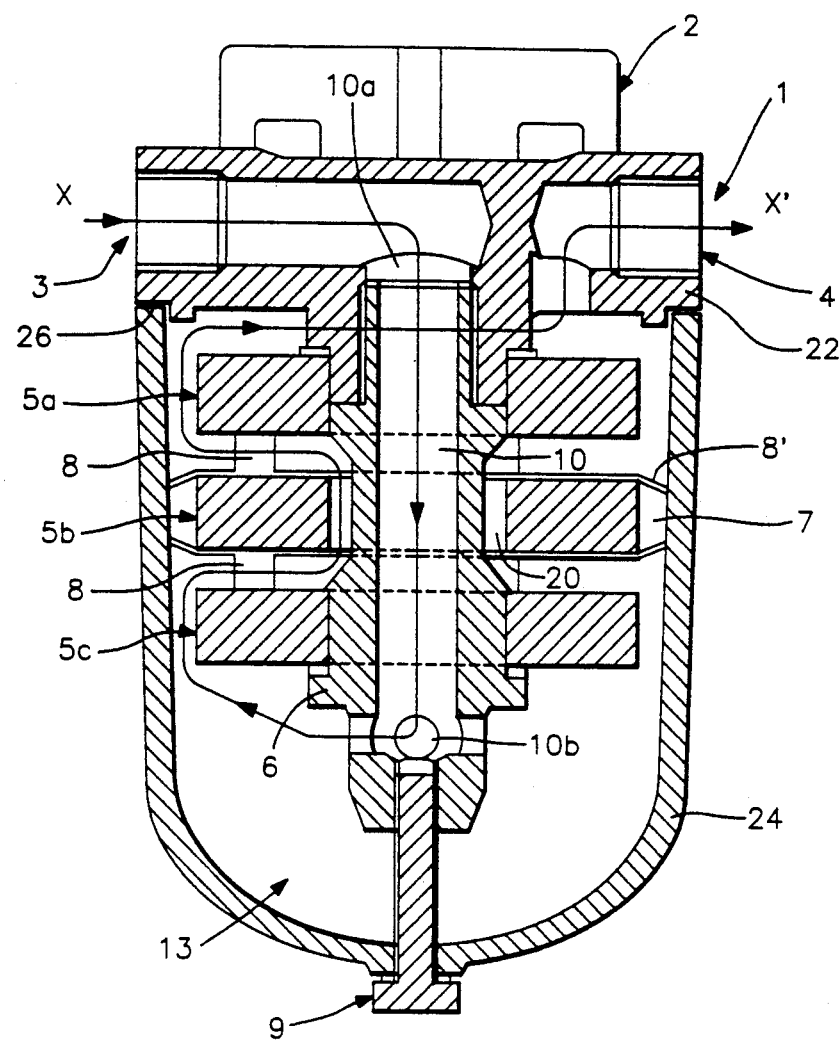
FIG. 1 is a cross-sectional view of one embodiment of an apparatus taken along the line A—A, shown in FIG. 2.
Figure 2:
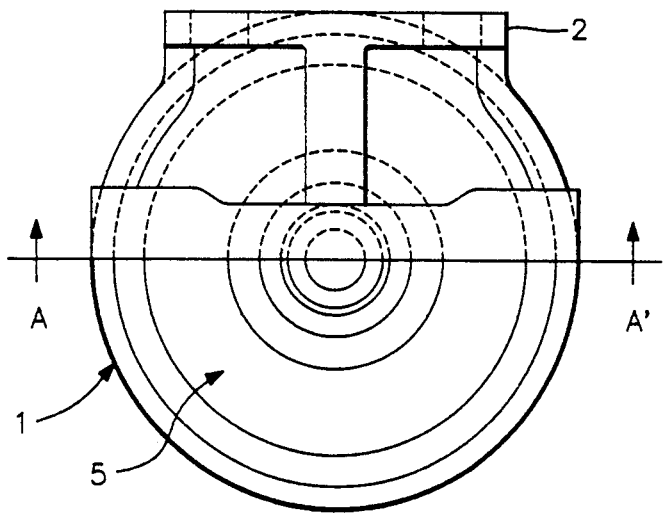
FIG. 2 is a schematic top plan view of the apparatus of FIG. 1.

FIGS. 1 and 2 illustrate a treatment apparatus consisting of a housing, indicated generally by arrow 1, that is circular in cross-section. The housing 1 consists of a head 22 and a bowl 24 attached beneath the head 22 along the lower periphery of the head 22. An annular seal 26 is provided between the upper edge of the bowl 24 and the head 22 The head 22 and the bowl 24 are made of aluminum (LM-6 grade) or a stainless steel which is substantially non-magnetizable. Alternatively, the bowl may be made of a transparent plastic to allow visual inspection of the contents of the bowl 24.

A mounting plate 2 is attached to the housing 1 and is used to secure the housing 1 in position. The head 22 has an inlet port 3 that leads into a hollow support tube 6 that is attached (by gluing or suitable threading) beneath the head 22 and that extends along the longitudinal axis of the housing 1. The support tube 6 forms a passage 10 for fluid to enter the bowl 24. The distal end of the support tube 6 has a plurality of apertures 10b in it for fluid to flow from the passage 10 into a chamber 13 defined in the bowl 24. The distal end of the support tube 6 is fastened to the bowl 24 by a securing bolt 9. In this way, the securing bolt 9 secures the bowl 24 to the head 22. The support tube 6 is made of material that is non magnetizable or that is only slightly magnetizable. Stainless steel and plastics have been used successfully. Of course the material will be chosen so that the support tube 6 is not corroded by the fluid passing through the apparatus. An exit port 4 in the head 22 connects the chamber 13 to a downstream pipe (not shown) for fluid to leave the apparatus.

A plurality of annular magnets 5a, 5b and 5c, of ceramic material, are mounted one above the other in the chamber 13 about the support tube 6 to form a stack. The axis of each magnet 5a, 5b and 5c coincides with the axis of the housing 1 and the support tube 6. Each magnet 5a, 5b and 5c is separated from each adjacent magnet by a spacer 8. This provides a fluid flow path between each pair of adjacent magnets. Each spacer 8 includes an extended portion 8' that seals against the inner wall of the bowl 24 to form a fluid-tight seal between the center magnet 5b and the bowl 24. An air gap 7 is in the seal. The spacers 8 are made of suitable acetyl plastics. The support tube 6 has a recess 20 in its outer wall adjacent the center magnet 5b to provide a fluid flow path between the center magnet 5b and the support tube 6.

The inner edge of the upper magnet 5a and the inner edge of the lower magnet 5c each abuts against the support tube 6 but each outer edge does not extend to the inner wall of the bowl 24. In this way, a fluid passage is created between the outer edge of upper magnet 5a and lower magnet 5c and the inner wall of the bowl 24.

Fluid enters the apparatus through the inlet port 3 and flows into the passage 10 in the support tube 6. The fluid then leaves the support tube 6 through the apertures 10b and flows into the chamber 13. The fluid then flows between the lower magnet 5c and the inner wall of the bowl 24, between the opposing faces of the lower magnet 5c and the center magnet 5b and between the inner edge of the center magnet 5b and the support tube 6 to emerge between the faces of the center magnet 5b and the upper magnet 5a. The fluid then flows between the outer edge of the upper magnet 5a and the inner wall of the bowl 24 and into the outlet port 4. One possible path taken by the fluid is indicated by the arrow X-X'.

Figure 3:
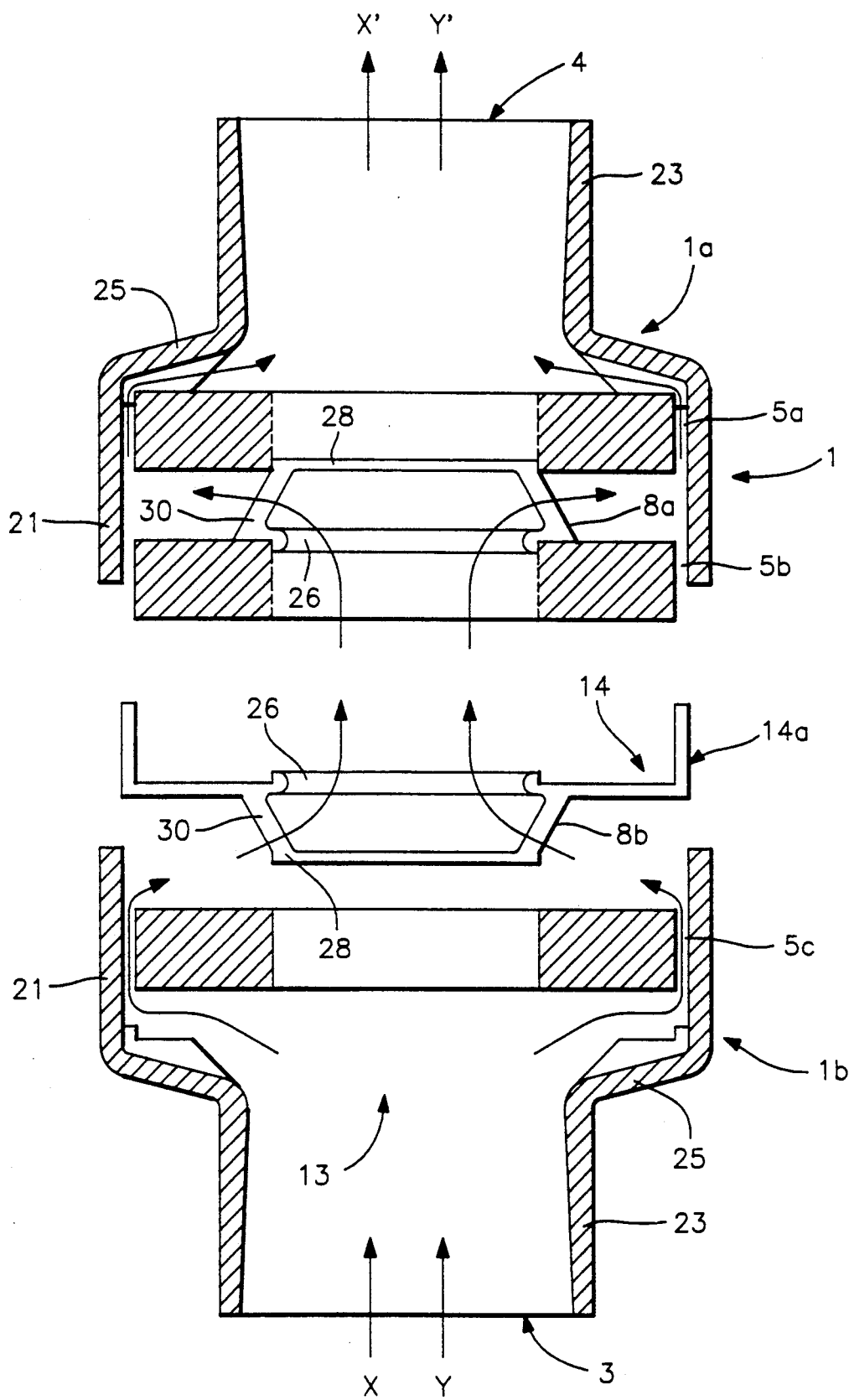
FIG. 3 is a partly exploded cross-section of a further embodiment.

FIG. 3 illustrates another embodiment in which the housing 1 comprises heads 1a and 1b that connect together. This can be done by welding or gluing the heads 1a, 1b together. Each head 1a, 1b is circular in cross-section and has an inner portion 21 of greater diameter than an outer portion 23. The inner portion 21 is connected to the outer portion 23 by a connecting portion 25 of varying diameter. When connected together, the inner portions 21 of the heads 1a and 1b provide the chamber 13 in which the magnets 5a, 5b and 5c are received. One outer portion 23 provides the inlet port 3 and the other provides the outlet port 4.

The magnets 5a, 5b and 5c are arranged in the apparatus in a stack with the axis of each magnet aligned on the axis of the housing 1. The magnets 5a, 5b and 5c are separated from each other by a pair of spacers 8a and 8b with one spacer 8a, 8b placed between each pair of magnets. Each spacer 8a and 8b comprises an annular seal 26 connected to a disc seal 28 by a plurality of legs 30. The annular seal 26 and the disc seal each have a portion of outer diameter selected to seal in the bore of the magnet 5a, 5b and 5c to which it is attached. The lower spacer 8b has a flange portion 14 extending outwardly from its annular seal 26 and terminating in a tubular portion 14a. The tubular portion 14a has inner diameter of a size to snugly and sealingly receive in it the center magnet 5b. The outer diameter of the tubular portion 14a is selected to sealingly engage the heads 1a, 1b. In this way the flange 14 and the tubular portion 14a fit about the center magnet 5b to form a seal between the magnet 5b and the inner wall of the housing 1.

The disc seal 28 of the upper spacer 8a is arranged to seal against the upper magnet 5a while the annular seal 26 seals against the center magnet 5b. The disc seal 28 of the lower spacer 8b is arranged to seal against the lower magnet 5c while the annular seal 26 seals against the center magnet 5b. The flange 14 and tubular portion 14a of the lower spacer 8b seal against the center magnet 5b and between it and the housing 1.

Fluid enters the apparatus through the inlet port 3 and from there flows between the lower magnet 5c and the inner wall of the housing 1 because the disc seal 28 prevents it from flowing through the bore of the lower magnet 5c. The fluid then flows between the opposing faces of the lower magnet 5c and the center magnet 5b and into the bore of the center magnet 5b to emerge between the faces of the center magnet 5b and the upper magnet 5a. The fluid then flows between the outer edge of the upper magnet 5a and the inner wall of the housing 1 and into the outlet port 4. Possible paths taken by the fluid are indicated by the arrows X-X' and Y-Y'.

Figure 4:
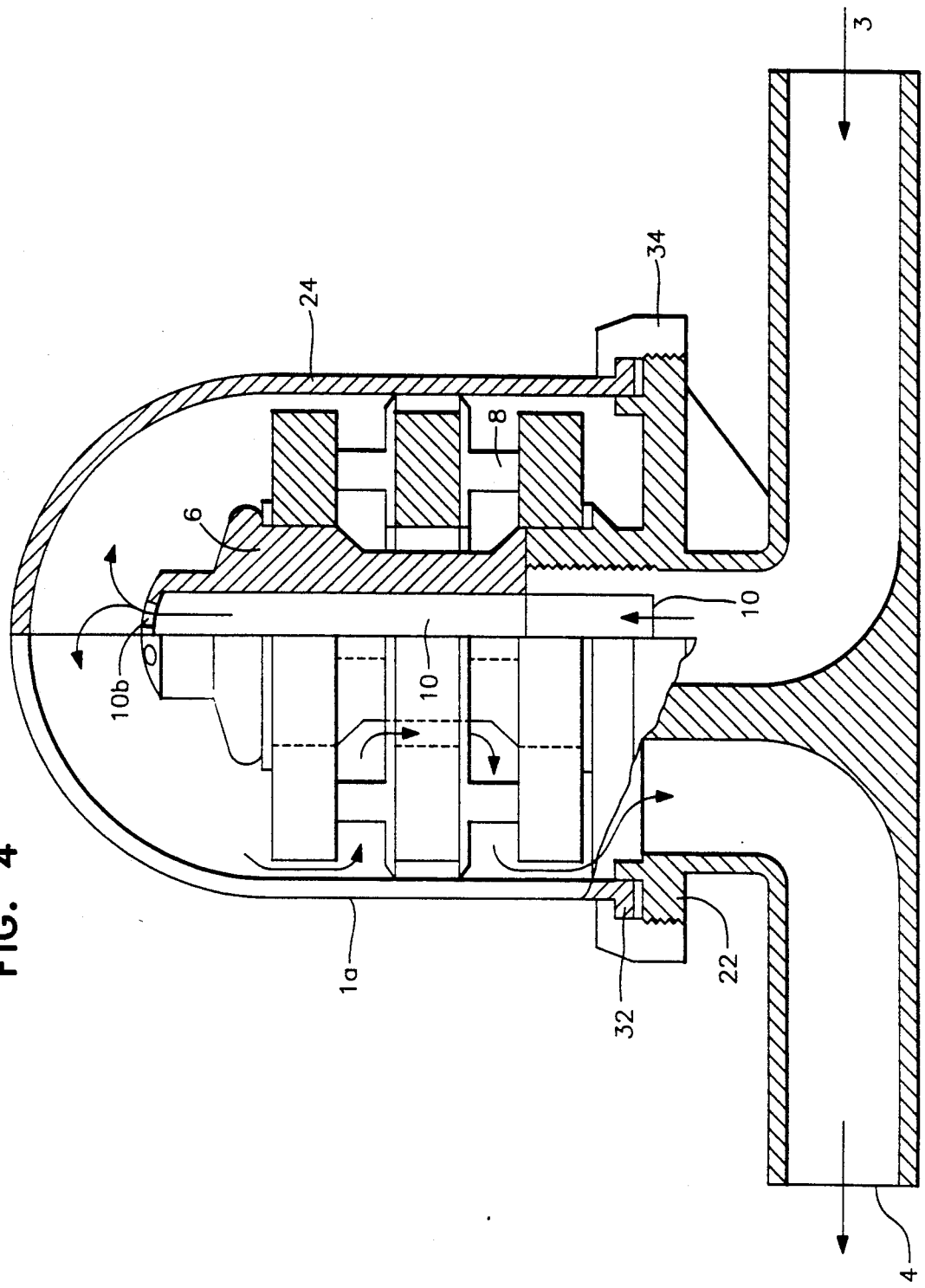
FIG. 4 is a partial cross-section of another embodiment.

FIG. 4 illustrates a variation of the apparatus of illustrated in FIG. 1. In this example the inlet and outlet ports 3 and 4 respectively are lengthened. Also, the bowl 24 has a lateral flange 32 at its free edge that is engaged and held against the head 22 by a ring clip 34. The ring clip 34 has an inner threaded portion that threads on an outer threaded portion of the head 22 to hold the bowl 24 against the head 22. In this way the securing bolt 9 is dispensed with. The bowl 24 of housing 1 is composed of a transparent, polycarbonate plastics material although it may be made of any suitable material.

Figure 5:
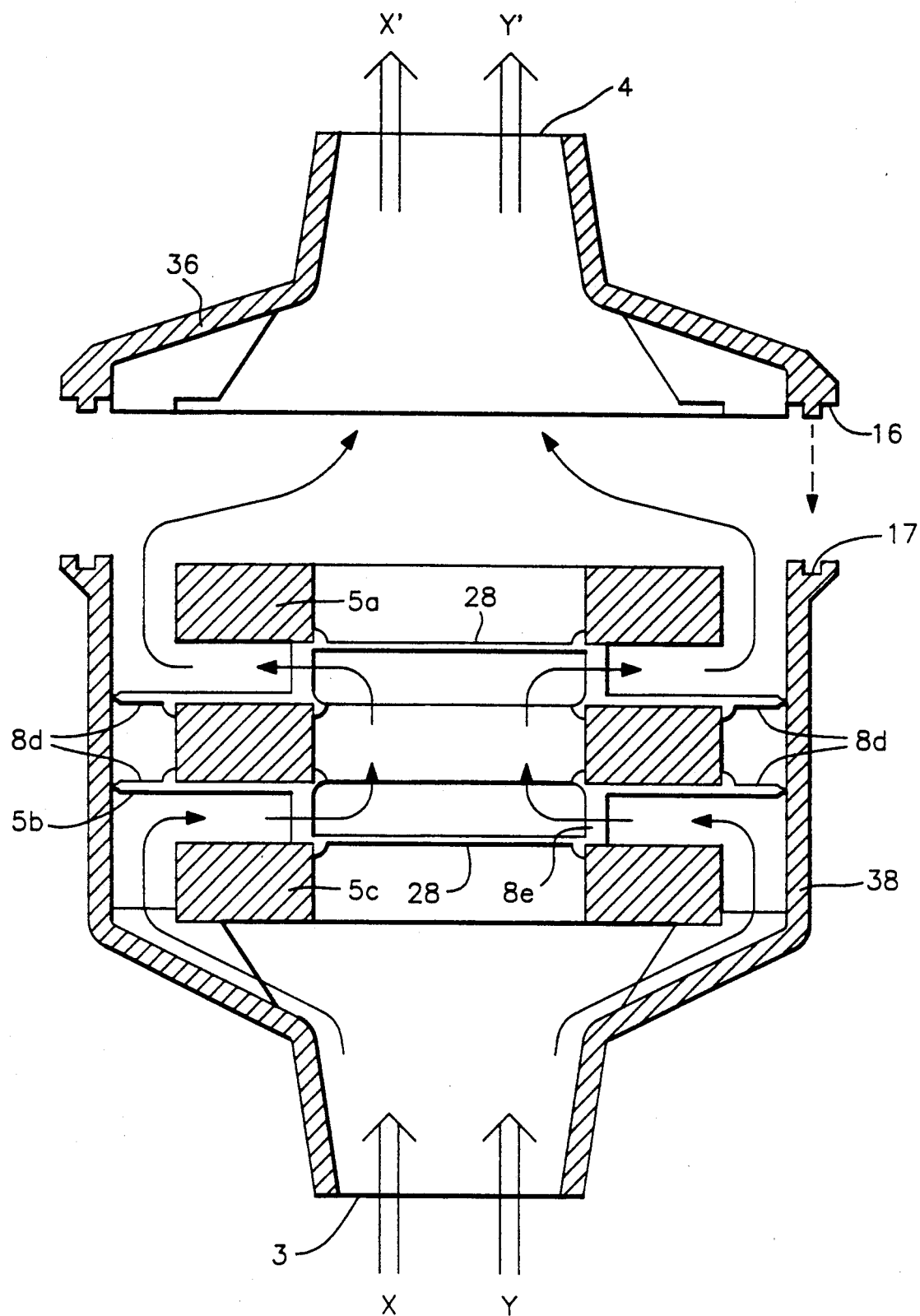
FIG. 5 is a partly exploded cross-section of a further embodiment.

FIG. 5 illustrates a variation of the embodiment illustrated in FIG. 3. In this embodiment the housing 1 consists of an upper head 36 and a lower head 38 which are both circular in cross-section. However, unlike the apparatus illustrated in FIG. 3, the heads 36 and 38 are not identical. The upper head 36 has a locking lip 16 projecting from its inner edge and the lower head 38 has groove 17 in its inner edge. The groove 17 is configured to receive the lip 16 in it so that the upper head 36 and the lower head 38 can be locked together. A pair of spacers 8e are positioned between each pair of adjacent magnets 5a, 5b and 5c. The spacers 8e are similar to the spacers 8a illustrated in FIG. 3 except that each is provided with an extension 8d to abut against the inner wall of the lower head 38 and seal the gap between the center magnet 5b and the inner wall of the lower head 38.

Fluid enters the apparatus through the inlet port 3 and flows between the lower magnet 5c and the inner wall of the lower head 38 because the disc seal 28 prevents it from flowing through the bore of the lower magnet 5c. The fluid then flows between the opposing faces of the lower magnet 5c and the center magnet 5b and into the bore of the center magnet 5b to emerge between the faces of the center magnet 5b and the upper magnet 5a. The fluid then flows between the outer edge of the upper magnet 5a and the inner wall of the lower head 38 and into the outlet port 4. Possible paths taken by the fluid are indicated by the arrows X-X' and Y-Y'.

Figure 6:
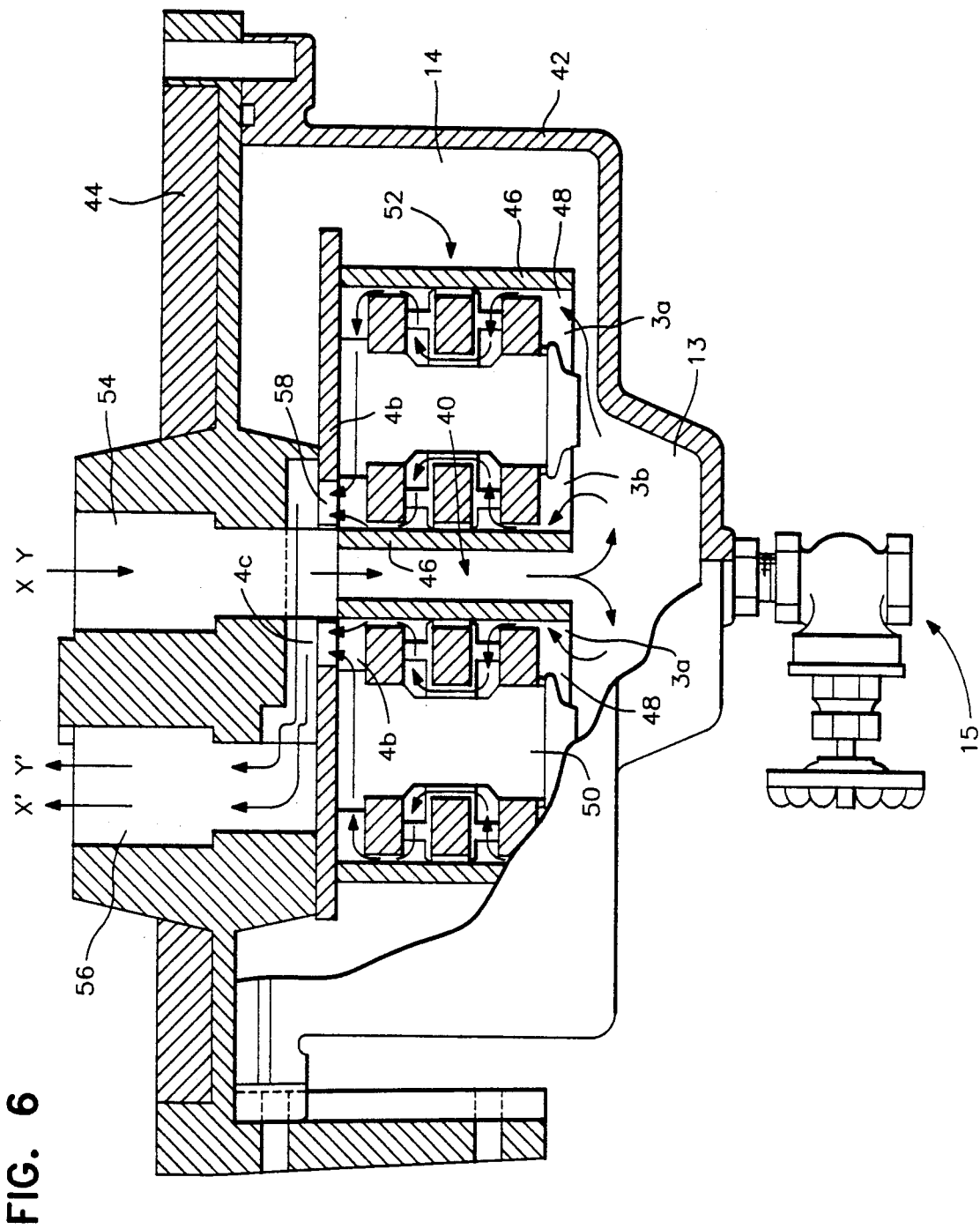
FIG. 6 is a multi-depth cross-sectional view of a combination device.

FIG. 6 illustrates a composite unit that consists of a sump 42 connected to a head 44. The head 44 has an inlet port 54 and an outlet port 56. A core unit 46 of non-magnetizable material is attached beneath the head 44. The core unit 46 has two pairs of chambers 48 in each of which a support post 50 extends. Only two chambers 48 are shown. The external profile of each support post 50 is similar to the support tube 6 illustrated in FIG. 1. The support posts 50, however, are not hollow. A stack 52 of three magnets 5 is supported around each support post 50. The core unit 46 has a conduit 40 positioned in between the stacks 52 and connected to the inlet port 54. The conduit 40 opens into a chamber 13 in the sump 42.

Each chamber 48 in the core unit 46 has inlet ports 3a and 3b at its lower end connecting the chamber 48 to the chamber 13 in the sump 42. Each chamber 48 has an exit port 58, at the end opposite the inlet ports 3a and 3b, that is connected to the outlet port 56 in the head 44. The magnets 5 in each stack 52 are arranged about the support post 50 in the same fashion as the magnets 5 about the support tube 6 in FIG. 1. A drain cock 15 is positioned beneath the sump 42.

In use, fluid enters the apparatus through the inlet port 54 and flows down the conduit 40 into the chamber 13 in the sump 42. The fluid then flows into the inlet ports 3a and 3b of each chamber 48. Thereafter the fluid flows between the lower magnet 5c and the inner wall of the chamber 48, between the opposing faces of the lower magnet 5c and the center magnet 5b and between the inner edge of the center magnet 5b and the support post 50 to emerge between the faces of the center magnet 5b and the upper magnet 5a. The fluid then flows between the outer edge of the upper magnet 5a and the inner wall of the chamber 48 and into the exit port 58. From there the fluid flows to the outlet port 56. Possible paths taken by the fluid are indicated by the arrows X-X' and Y-Y'.

Fluid not entering the inlet ports 3a or 3b of either chamber 48 circulates within chamber 13 where it is exposed to the fields of each stack 52.

Plainly the stacks 52 can be replaced by the stacks illustrated in FIGS. 3 and 5. Also, various combinations of the embodiments of FIGS. 1 to 5 may be used in multiple rows of the type shown in FIG. 6.

Figure 7:
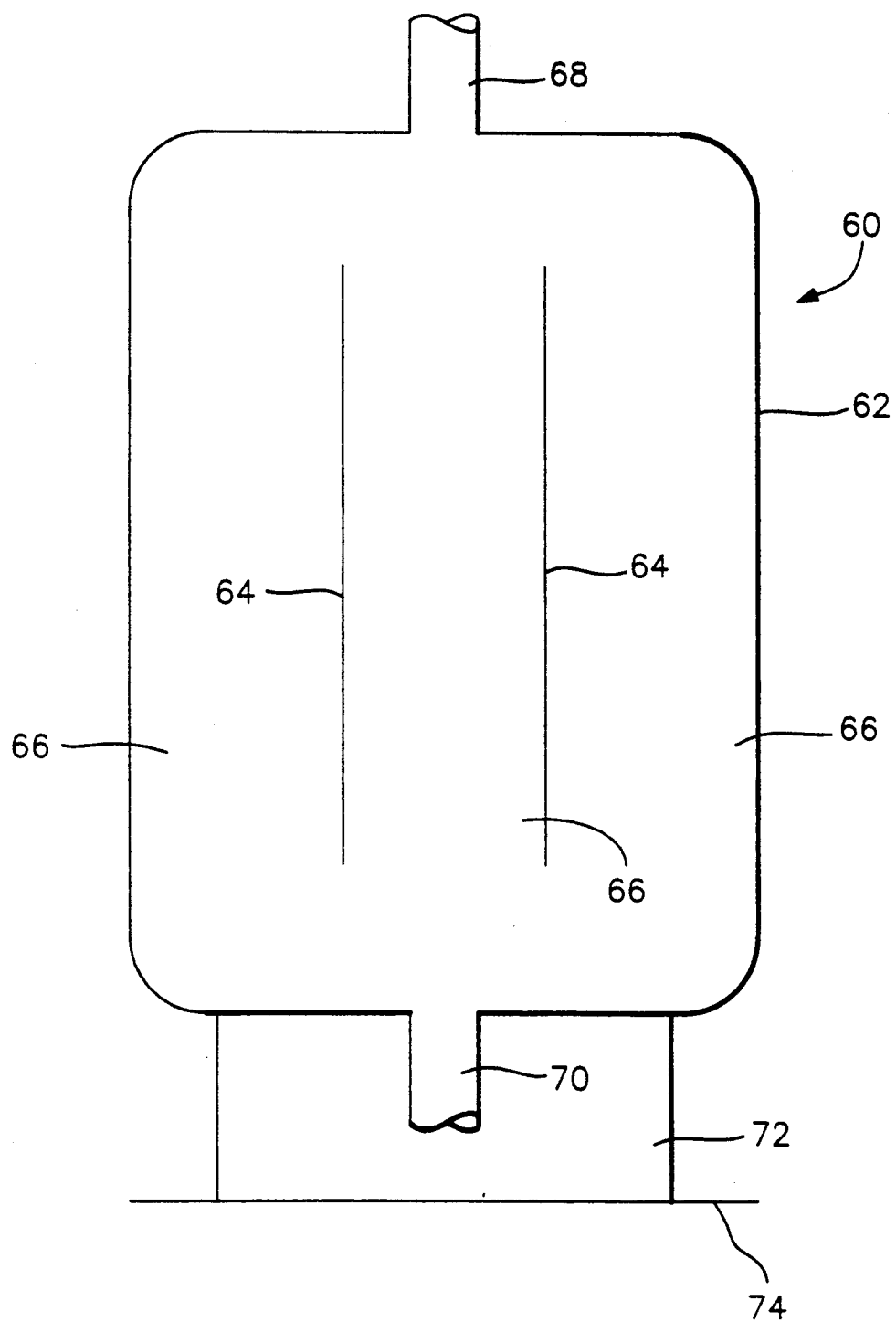
FIG. 7 is a schematic view of another combination device.

FIG. 7 illustrates a combination apparatus 60 that is used to treat diesel fuel. The apparatus 60 consists of a housing 62 that has two internal separating walls 64 extending parallel to each other for most of the length of the housing 62. The separating walls 64 define three chambers 66 that are substantially identical. A stack of magnets (not shown) is arranged in each chamber 66 in a manner similar to that illustrated in any one of FIGS. 1 to 5. The apparatus 60 has an inlet 68 at its upper end and an outlet 70 at its lower end. A suitable distributor means (not shown) is positioned beneath the inlet 68 to distribute incoming fuel between the chambers 66.

A stand 72 having a base plate 74 is attached to the apparatus 60. In this way the apparatus can be positioned on a suitable surface in a "stand alone" manner.

Typically, for treatment of the fuel in a motor vehicle, an apparatus such as that illustrated in FIGS. 1 and 3 would be used. The apparatus can be connected in the vehicles fuel line and typically would be of volume of about 360 ml. The flow path lengths X to X' and Y to Y' are of the order of 0.5 to 1.5 meters. A typical flow rate would be between 500 to 3000 ml per minute. This provides an average residence time in the apparatus of between 7 to 43 seconds.

Slurries may require a longer flow path, of the order of 2–5 meters and hence a longer residence time in the apparatus. Powdered food products, such as milk powder may require a flow path of from 1 to 4 meters and a residence time of up to 150 s.

Too great a flow rate may cause "dampening" of the magnetic field effect and this would require the fluid to be passed through a number of apparatus in series to achieve satisfactory inhibition.

It will also be appreciated that a greater number of magnets also may be spaced within a suitably dimensioned container to increase the length of passage through the magnetic field, where a specific species or other functional requirement so dictates. Such variation will be well recognized by one skilled in the art.

Although reference here has been to a cylindrical system with disc shaped magnets, it is envisaged that square or other polygonal shapes may be used. Any type of magnet can be used but permanent magnets of ceramic material are preferred. Examples of these would be sintered ferrite magnets (Ferrite 5) and iron oxide, barium oxide and strontium oxide admixture magnets. Electromagnets also can be used.

Figure 8:
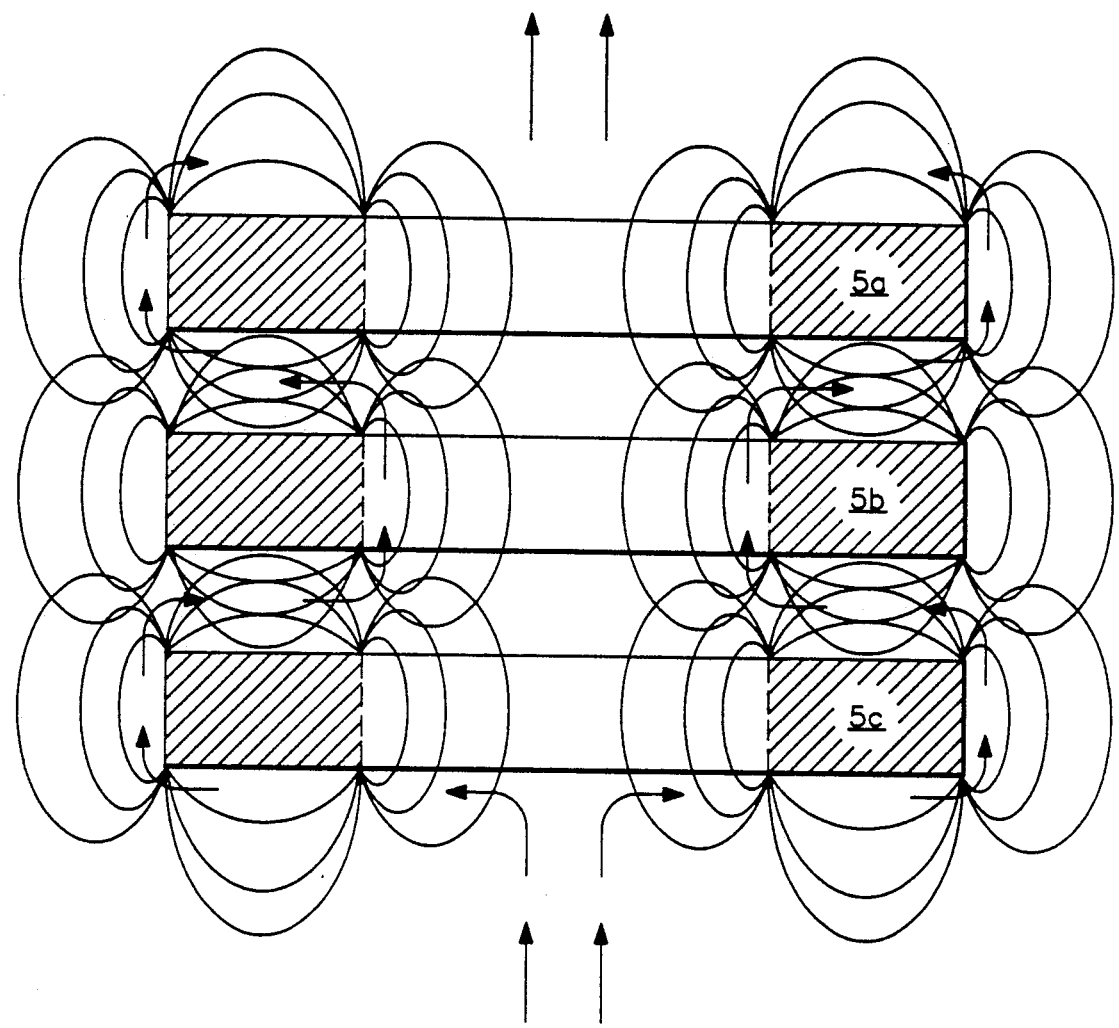
FIG. 8 is a schematic view showing the lines of flux around a typical magnetic stack and a fluid flow path through the stack.

FIG. 8 is a schematic diagram, in cross-section, of the three magnets illustrated in FIGS. 1 to 5. The magnets are surrounded by lines depicting the magnetic flux patterns It will be appreciated that the patterns, shape and intensity of these flux lines will fluctuate and vary with time. Also shown in FIG. 8 is an example of a suitable flow path through the fields. It will be appreciated that when the fluid enters the gap between the magnets, it is subjected to intense fields of differing polarities from one point on the flow path to the next. It is believed that much of the lysis of the protista occurs in these regions. It will also be appreciated that the turbulence of the fluid in this region will be high and that this will also be detrimental to the protista.

Figure 9:
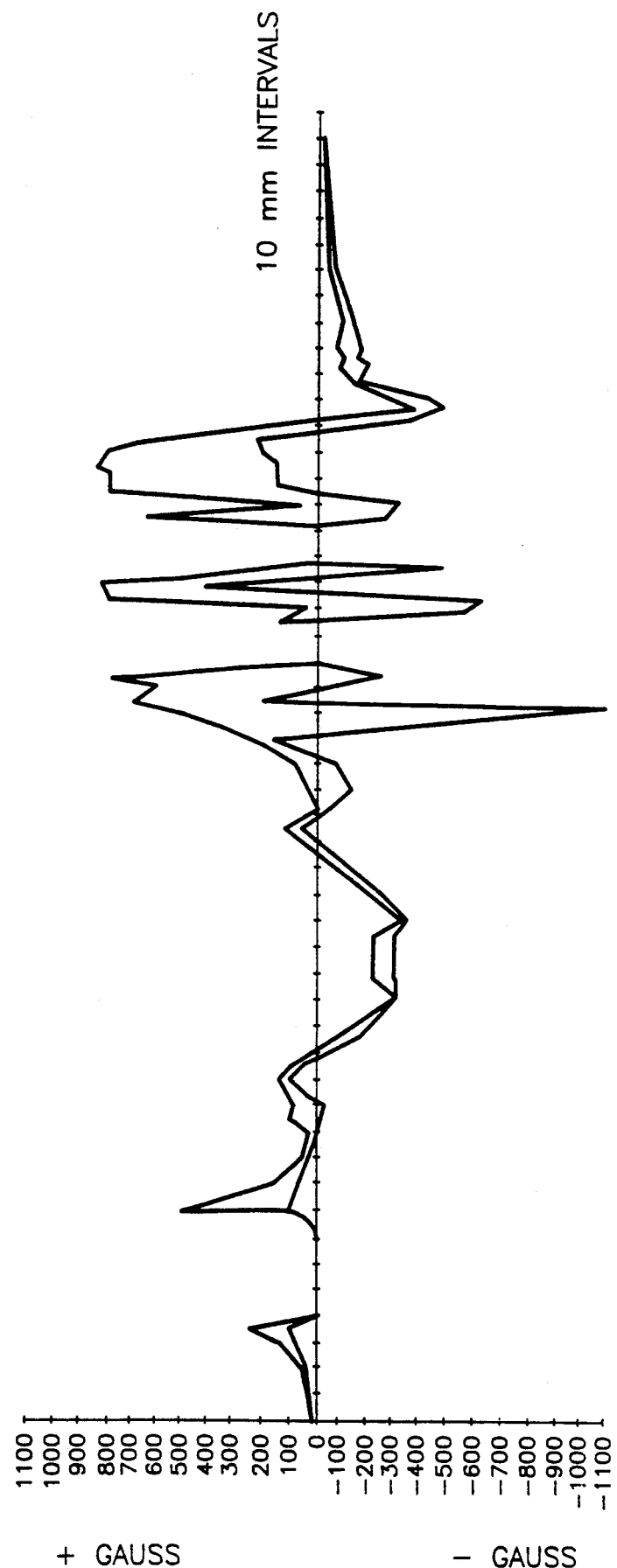
FIG. 9 is a plot of field strength along a flow path through the embodiment illustrated in FIG. 1.

FIG. 9 illustrates a plot of the minimum and maximum field strengths experienced by a particle passing through an apparatus of the type illustrated in FIG. 1. The value of "negative gauss" indicates that the field has a polarity opposite the field from which the particle has just left. The data points represent typical magnetic strengths in the vicinity of generally plus or minus 3 millimeters of the point designated on or about the surface of the magnets, and internal walls or structures of the device.

Where the fluid passes around an edge of an annular magnet, the inflexions are extremely variable. Therefore an organism, when passing through the device, can be subjected to a very wide variation of flux densities in minutely differing paths. To obtain extremely variable inflexions and wide variations of flux densities, the magnets are mounted with unlike poles opposed.

As a result, any protista in the medium are subjected to very wide fluctuations in magnetic field strengths, such that the physiological and biochemical systems of organisms are severely disrupted and, in specific cases, the organisms destroyed.

The applicant believes the orientation of the protista to the field is important. The studies made by Kimball G. C.; 1937; "The Growth of Yeasts in a Magnetic Field"; Phd Thesis, Cornell University and Feinendegen L. E. and Muhlensiepen H.; 1988; "Effect of Static Magnetic Field on Cellular Metabolism in the Living Mouse"; *Endeavour, New Series;* Vol 12, No. 2. tend to support this belief. Evidence suggests that at certain angles the field effect is more disruptive of the cells, process and structure. By ensuring a flow path of approximately 0.5 meters length, along which is the extremely variable and fluctuating field effects of the magnets, it is ensured that a sufficiently large proportion of protista are subjected to the field at the preferred orientation to achieve high levels of inhibition.

EXAMPLE 1

The effectiveness of the apparatus illustrated in FIG. 1 was tested in relation to an affected diesel fuel blend. For comparison, the fuel blend was passed through an apparatus that had baffles similar to the magnets but did not have magnets.

Two identical test rigs were constructed; the first containing an apparatus identical to that shown in FIG. 1 except that it contained unmagnetized discs while the second contained an apparatus that had fully magnetized discs.

Each apparatus comprised a stack of three Superrite TM SM-2 magnets in a stainless steel housing. These magnets are composed of $BaO.6Fe_2O_3$ and $SrO.6Fe_2O_3$ and have a specified residual flux density of 3700–4000 gauss. The volume of each apparatus was 360 ml. Each apparatus was immersed in a water bath that was maintained at 30° C. during the tests. Each apparatus was connected to a liquid reservoir so that liquid could be circulated from the reservoir to the apparatus and returned to the reservoir. An immersion pump (Tecumseh "Little Giant" model 1-7-PW) was positioned in each reservoir to circulate the liquid through the rig. The pump delivered about 1400 ml per minute of the diesel fuel blend through each rig. Flow meters were connected to each rig.

The diesel fuel blend used in the tests was prepared by dosing a diesel fuel, stated to be biocide free, with about 3% (v/v) with a heavily contaminated fuel/water blend supplied by the applicants. The contaminated fuel contained *Hormocornis resinae, Paedilomyces variotii, Penicillium spp* and *Pseudomonas aeruginosa*. The level of microbiological contamination of the water component of the fuel blend was checked before use as described below. Prior to use, the fuel blend was held at room temperature for 7 days, with occasional mixing, to ensure that the microbiological population reached equilibrium. Regular colony counts were done.

At the start of each test, 10 to 15 liters of sterile filtered diesel fuel was loaded into each reservoir and circulated through the rig for about 60 minutes. The fuel was then pumped to waste. A further 5 to 10 liters of the sterile filter diesel fuel was then added to each reservoir and pumped through the units directly to waste. This was done to ensure removal of grease and other contaminants prior to loading the rigs with test fuel.

Twenty liters of the prepared test fuel blend was then added to each reservoir. The pumps were started and the water bath temperature was raised to 30 degrees C. The temperature of the test fuel was monitored and showed a rise to the 30° C. within 60 minutes of startup.

The units were run continuously during the day from 0700 to 1700 hours, being started and stopped with automatic timers. These timers also switched off the water bath, so that the temperature of the fuel in the reservoirs fell back from 30 degrees C. to ambient (15 to 20 degrees) overnight. This was done to simulate the stop/start conditions of a truck, and to allow the normal cyclic heating and cooling of the fuel and the associated condensation of water.

The flow meters were checked at least twice a day to ensure constant running conditions. The temperatures of the liquids in the rigs and the water bath were also monitored. Fuel samples were removed from both rigs at predetermined times shown in Tables 1 and 2. The samples were collected aseptically from the fuel return lines in dry, sterile bottles. 100 ml was taken for microbiological testing and 50 ml for physico-chemical testing. Further samples were taken at the end of each days' running from the bottom of the chamber 13 of each apparatus. This was done to check for the presence of separated water.

Colony counts and water determinations were also done on the samples as described above. All residues of fuel samples were discarded after use, and not returned to the rigs. The fuel removed from the units as samples was not made up, so the fuel level in the reservoirs progressively fell during the trial.

MICROBIOLOGICAL TESTING

Fungi and Yeasts

Two volumes of fuel (50 ml) were vacuum filtered ascetically on sterile 0.45 micron membrane filters (Millipore type HAWG, 47 mm). The filters were then placed in sterile plastic Petri dishes and sterile molten malt-extract agar poured over them. The agar was allowed to set and the dishes incubated at 25° C. for at least 5 days. The colonies were then counted and the results recorded as colony-forming units (cfu) per liter of fuel filtered. With the method used for this trial, the maximum countable level for fungi was 1000 cfu/litre.

The types of fungi and yeast were determined microscopically.

Bacteria

Essentially the same method was used as for the yeasts except that a sterile 0.22 micron filter was used and medium was nutrient agar. Incubation was at 25° C. for 2 days.

PHYSICO-CHEMICAL TESTING

Turbidity

Fuel turbidity was determined on the freshly-taken samples by direct measurement in a Hach Turbidimeter (Model Ratio/XR). Results were recorded as NTU (nephelometric turbidity units).

Optical Density

Visible range optical density (absorbance) of the fuel samples was measured in a Varian Spectro-photometer (Model DMS 100) at a range of wavelengths (450, 500, 550 nm) in 1 cm cells against air reference. This was done as a further means of detecting changes in fuel turbidity, and was recorded as Optical Absorbance units as specified wavelengths.

Both turbidity and optical density were measured as means of detecting changes in suspended solids levels in the fuel, especially that associated with microbiological growth. Neither method is capable of detecting very low levels of growth, nor discriminating between microbial growth and "cloudiness" or fuel haze caused by other means, e.g. water droplets suspended in the fuel, but served as a rapid non-destructive backup to the microbiological testing.

Acid Value

Fuel samples were titrated with 0.02M. KOH (in iso-propyl alcohol) against phenolphthalein indicator to determine the acid value of the fuel. This was recorded as mg KOH/g fuel. Increases in fuel acidity, and hence acid value, often result from microbiological activity in fuels.

Water Content

Fuel water content was measured by a standard Karl-Fischer method, and reported as ppm water in the fuel (ug water/g fuel). Filter draining samples were checked both by Karl-Fischer and by direct observation for separated water.

RESULTS

Microbiological

All Microbiological counts are listed in Tables 1 and 2. It should be remembered that the maximum countable level is 1000 cfu/liter. Thus, "1000 cfu" could in fact be significantly higher.

Fungi and Yeast

It can be seen that for *H. resinae* and *P varioll* the cfu fell away more rapidly in the rig using the magnetic field. However, it did fall away for the unmagnetised rig. The applicant believes that the turbulence in the apparatus would have caused the decline in the fungi.

The amounts of Penicillium spp remained high in the unmagnetised apparatus but fell away in the magnetised apparatus apart from localised peaks which could have caused by colonies, previously trapped in the lines, coming loose and circulating through the system.

Bacteria

The amount of bacteria fell away rapidly in both rigs. This could be due to the turbulence in the apparatus as well as the bacteria forming fixed colonies in inaccessible areas of the rigs and therefore not passing the sampling points.

TABLE 1

| SAMPLE | | Unmagnetized Rig | | | BACTERIA CFU/L |
|---|---|---|---|---|---|
| | | FUNGI (COLONY FORMING UNITS/LITER) | | | |
| DAY | TIME (HRS) | HORMO RESIN | PAECIL VARIOL | PENICI spp | *PSEUDOM AERUGIN* |
| 0 | | 430 | 930 | 550 | 1000 |
| 1 | 1.0 | 20 | 1000 | 105 | 0 |
| 1 | 3.0 | 0 | 1000 | 0 | 0 |
| 1 | 5.0 | 0 | 1000 | 95 | 100 |
| 1 | 7.0 | 38 | 1000 | 0 | 0 |
| 1 | 9.0 | 0 | 1000 | 78 | 50 |
| 2 | 26.5 | 0 | 1000 | 30 | 0 |
| 2 | 29.5 | 25 | 1000 | 0 | 0 |
| 2 | 32.5 | 0 | 1000 | 15 | 0 |
| 3 | 50.5 | 100 | 1000 | 0 | 0 |
| 3 | 53.5 | 0 | 1000 | 0 | 0 |
| 3 | 56.5 | 58 | 1000 | 35 | 0 |
| 4 | 74.5 | 0 | 1000 | 0 | 3 |
| 4 | 77.5 | 0 | 400 | 5 | 1 |
| 4 | 80.5 | 0 | 0 | 80 | 0 |
| 5 | 98.5 | 0 | 0 | 84 | 0 |
| 5 | 101.5 | 0 | 0 | 29 | 1 |
| 5 | 104.5 | 0 | 0 | 55 | 0 |
| 6 | 122.5 | 0 | 0 | 781 | 1 |
| 6 | 125.5 | 0 | 0 | 657 | 0 |
| 6 | 128.5 | 0 | 0 | 0 | 0 |
| 7 | 146.5 | 0 | 0 | 568 | 0 |
| 7 | 149.5 | 0 | 0 | 100 | 0 |
| 7 | 152.5 | 0 | 100 | 0 | 0 |
| 8 | 172.0 | 0 | 0 | 60 | 0 |
| 9 | 196.0 | 0 | 0 | 0 | 0 |
| 10 | 220.0 | 0 | 0 | 0 | 0 |
| 11 | 244.0 | 0 | 0 | 500 | 0 |

TABLE 1-continued

| | | Unmagnetized Rig | | | |
|---|---|---|---|---|---|
| SAMPLE | | FUNGI (COLONY FORMING UNITS/LITER) | | | BACTERIA CFU/L |
| DAY | TIME (HRS) | HORMO RESIN | PAECIL VARIOL | PENICI spp | PSEUDOM AERUGIN |
| 12 | 268.0 | 0 | 0 | 0 | 60 |
| 13 | 292.0 | 0 | 0 | 380 | 0 |
| 14 | 316.0 | 0 | 0 | 130 | 0 |
| 15 | 340.0 | 0 | 0 | 100 | 0 |

TABLE 2

| | | Magnetized Rig | | | |
|---|---|---|---|---|---|
| SAMPLE | | FUNGI (COLONY FORMING UNITS/LITER) | | | BACTERIA CFU/L |
| DAY | TIME (HRS) | HORMO RESIN | PAECIL VARIOL | PENICI spp | PSEUDOM AERUGIN |
| 0 | | 430 | 930 | 550 | 1000 |
| 1 | 1.0 | 0 | 100 | 140 | 0 |
| 1 | 3.0 | 0 | 150 | 0 | 26 |
| 1 | 5.0 | 0 | 100 | 2 | 0 |
| 1 | 7.0 | 0 | 0 | 160 | 0 |
| 1 | 9.0 | 0 | 90 | 100 | 70 |
| 2 | 26.5 | 0 | 0 | 10 | 0 |
| 2 | 29.5 | 0 | 0 | 20 | 0 |
| 2 | 32.5 | 0 | 0 | 10 | 0 |
| 3 | 50.5 | 0 | 0 | 0 | 0 |
| 3 | 53.5 | 0 | 0 | 0 | 0 |
| 3 | 56.5 | 0 | 0 | 10 | 0 |
| 4 | 74.5 | 0 | 0 | 60 | 0 |
| 4 | 77.5 | 0 | 0 | 80 | 0 |
| 4 | 80.5 | 0 | 0 | 0 | 0 |
| 5 | 98.5 | 0 | 0 | 0 | 20 |
| 5 | 101.5 | 0 | 0 | 20 | 0 |
| 5 | 104.5 | 0 | 0 | 20 | 0 |
| 6 | 122.5 | 0 | 0 | 0 | 0 |
| 6 | 125.5 | 0 | 0 | 540 | 0 |

TABLE 2-continued

| | | Magnetized Rig | | | |
|---|---|---|---|---|---|
| SAMPLE | | FUNGI (COLONY FORMING UNITS/LITER) | | | BACTERIA CFU/L |
| DAY | TIME (HRS) | HORMO RESIN | PAECIL VARIOL | PENICI spp | PSEUDOM AERUGIN |
| 6 | 128.5 | 0 | 0 | 0 | 0 |
| 7 | 146.5 | 0 | 0 | 0 | 0 |
| 7 | 149.5 | 0 | 0 | 500 | 0 |
| 7 | 152.5 | 0 | 0 | 0 | 0 |
| 8 | 172.0 | 0 | 0 | 30 | 0 |
| 9 | 196.0 | 0 | 0 | 0 | 0 |
| 10 | 220.0 | 0 | 0 | 0 | 0 |
| 11 | 244.0 | 0 | 0 | 25 | 0 |
| 12 | 268.0 | 0 | 0 | 0 | 0 |
| 13 | 292.0 | 0 | 0 | 10 | 0 |
| 14 | 316.0 | 0 | 0 | 0 | 0 |
| 15 | 340.0 | 0 | 0 | 80 | 0 |

Physico-Chemical

All relevant results are listed in Table 3.

TABLE 3

TRIAL NO. 1 PHYSICO-CHEMICAL RESULTS

| | | | | UNIT 1: UNMAGNETIZED | | | | | | UNIT 2: MAGNETIZED | | | | | |
|---|---|---|---|---|---|---|---|---|---|---|---|---|---|---|---|
| SAMPLE | TIME | DAY | HOURS | ACID No | NTU | E450 | E500 | E550 | WATER ppm | ACID No | NTU | E450 | E500 | E550 | WATER ppm |
| | | | 0.0 | 0.054 | 6.00 | 0.311 | 0.172 | 0.108 | 413 | 0.054 | 6.00 | 0.311 | 0.172 | 0.108 | 413 |
| 1 | 0900 | 1 | 1.0 | 0.052 | 5.86 | 0.310 | 0.172 | 0.105 | 356 | 0.054 | 5.85 | 0.312 | 0.174 | 0.109 | 257 |
| 2 | 1100 | | 3.0 | 0.055 | 6.70 | 0.315 | 0.177 | 0.110 | 480 | 0.050 | 5.75 | 0.316 | 0.176 | 0.110 | 380 |
| 3 | 1300 | | 5.0 | 0.055 | 6.65 | 0.320 | 0.184 | 0.120 | 442 | 0.049 | 6.30 | 0.314 | 0.178 | 0.113 | 433 |
| 4 | 1500 | | 7.0 | 0.063 | 5.58 | 0.318 | 0.182 | 0.118 | 185 | 0.058 | 5.76 | 0.310 | 0.176 | 0.112 | 258 |
| 5 | 1700 | | 9.0 | 0.059 | 5.76 | 0.313 | 0.174 | 0.110 | 303 | 0.052 | 5.70 | 0.311 | 0.177 | 0.113 | 303 |
| 6 | 0900 | 2 | 25.0 | 0.060 | 5.70 | 0.311 | 0.175 | 0.112 | 261 | 0.062 | 5.70 | 0.312 | 0.176 | 0.112 | 297 |
| 7 | 1030 | | 26.5 | 0.057 | 5.70 | 0.309 | 0.175 | 0.112 | 282 | 0.059 | 5.80 | 0.309 | 0.174 | 0.111 | 198 |
| 8 | 1330 | | 29.5 | 0.063 | 5.80 | 0.313 | 0.176 | 0.110 | 311 | 0.059 | 5.60 | 0.312 | 0.178 | 0.116 | 273 |
| 9 | 1630 | | 32.5 | 0.062 | 5.60 | 0.317 | 0.183 | 0.120 | 227 | 0.064 | 5.60 | 0.313 | 0.180 | 0.118 | 236 |
| 11 | 1030 | 3 | 50.5 | 0.062 | 5.60 | 0.317 | 0.180 | 0.118 | 185 | 0.063 | 5.60 | 0.313 | 0.181 | 0.119 | 215 |
| 12 | 1330 | | 53.5 | 0.059 | 5.60 | 0.315 | 0.182 | 0.120 | 135 | 0.062 | 5.60 | 0.315 | 0.182 | 0.120 | 126 |
| 13 | 1630 | | 56.5 | 0.070 | 5.70 | 0.316 | 0.182 | 0.120 | 130 | 0.060 | 5.60 | 0.314 | 0.181 | 0.121 | 135 |
| 15 | 1030 | 4 | 74.5 | 0.058 | 5.40 | 0.321 | 0.184 | 0.119 | 135 | 0.062 | 5.40 | 0.315 | 0.179 | 0.116 | 126 |
| 16 | 1330 | | 77.5 | 0.057 | 5.60 | 0.316 | 0.183 | 0.120 | 160 | 0.059 | 5.60 | 0.314 | 0.180 | 0.118 | 181 |
| 17 | 1630 | | 80.5 | 0.057 | 5.70 | 0.317 | 0.182 | 0.120 | 135 | 0.059 | 5.50 | 0.315 | 0.182 | 0.121 | 198 |
| 19 | 1030 | 5 | 98.5 | 0.062 | 6.60 | 0.315 | 0.183 | 0.118 | 177 | 0.059 | 5.80 | 0.318 | 0.187 | 0.123 | 231 |
| 20 | 1330 | | 101.5 | 0.060 | 5.90 | 0.317 | 0.183 | 0.119 | 194 | 0.062 | 6.00 | 0.319 | 0.183 | 0.122 | 206 |
| 21 | 1630 | | 104.5 | 0.062 | 5.70 | 0.318 | 0.182 | 0.121 | 173 | 0.064 | 5.60 | 0.316 | 0.180 | 0.121 | 206 |
| 23 | 1030 | 6 | 122.5 | 0.066 | 5.15 | 0.369 | 0.206 | 0.132 | 202 | 0.064 | 5.20 | 0.362 | 0.204 | 0.132 | 206 |
| 24 | 1330 | | 125.5 | 0.070 | 5.10 | 0.343 | 0.194 | 0.122 | 202 | 0.062 | 5.30 | 0.353 | 0.203 | 0.133 | 206 |
| 25 | 1630 | | 128.5 | 0.072 | 5.50 | 0.335 | 0.195 | 0.126 | 233 | 0.062 | 5.50 | 0.343 | 0.201 | 0.133 | 231 |
| 27 | 1030 | 7 | 146.5 | 0.070 | 5.16 | 0.336 | 0.194 | 0.124 | 261 | 0.065 | 5.20 | 0.335 | 0.195 | 0.126 | 261 |
| 28 | 1330 | | 149.5 | 0.065 | 5.22 | 0.336 | 0.193 | 0.125 | 227 | 0.062 | 5.21 | 0.336 | 0.194 | 0.124 | 240 |
| 29 | 1630 | | 152.5 | 0.068 | 5.11 | 0.337 | 0.195 | 0.127 | 227 | 0.063 | 5.30 | 0.336 | 0.196 | 0.130 | 240 |
| 31 | 1200 | 8 | 172.0 | 0.070 | 5.30 | 0.325 | 0.190 | 0.125 | 244 | 0.064 | 5.32 | 0.320 | 0.190 | 0.123 | 168 |
| 33 | 1200 | 9 | 196.0 | 0.072 | 5.40 | 0.312 | 0.180 | 0.119 | 306 | 0.064 | 5.40 | 0.319 | 0.188 | 0.122 | 168 |
| 35 | 1200 | 10 | 220.0 | 0.068 | 5.40 | 0.318 | 0.185 | 0.122 | 194 | 0.063 | 5.50 | 0.318 | 0.185 | 0.124 | 177 |
| 37 | 1200 | 11 | 244.0 | 0.069 | 5.10 | 0.365 | 0.215 | 0.143 | 177 | 0.068 | 5.40 | 0.385 | 0.222 | 0.151 | 135 |
| 39 | 1200 | 12 | 268.0 | 0.068 | 5.20 | 0.377 | 0.224 | 0.153 | 181 | 0.066 | 5.30 | 0.357 | 0.206 | 0.138 | 164 |
| 41 | 1200 | 13 | 292.0 | 0.071 | 5.10 | 0.339 | 0.195 | 0.128 | 156 | 0.066 | 5.30 | 0.337 | 0.195 | 0.125 | 198 |
| 43 | 1200 | 14 | 316.0 | 0.070 | 5.20 | 0.342 | 0.199 | 0.131 | 248 | 0.064 | 5.40 | 0.365 | 0.212 | 0.145 | 139 |
| 45 | 1200 | 15 | 340.0 | 0.072 | 5.40 | 0.336 | 0.193 | 0.124 | 202 | 0.064 | 5.40 | 0.334 | 0.194 | 0.124 | 156 |

Turbidity

The turbidity results for each rig are similar except that the rig having the magnetized apparatus did not the have the occasional sharp increases in turbidity that the rig having the unmagnetized apparatus had.

Optical Density

The optical density results are similar for each rig.

Acid Value

The acid value results are similar for each rig except that the results for the rig having the magnetized apparatus are lower.

Water Content

The water content results for each rig are similar except that the rig having the magnetized apparatus tended to produce lower and more constant values.

In the main the results indicate that the apparatus having the magnets had a strong inhibiting effect.

EXAMPLE 2

A pilot scale laboratory trial was conducted to test the effectiveness of the apparatus in treating raw milk.

This trial was undertaken by running two identical test systems simultaneously on identical contaminated milk. One system was 'active' (magnetized), the other 'inactive' and the recirculated milk was monitored for its microbiological status. Two identical test systems were each constructed. System 1 used an apparatus containing fully magnetized discs, while system 2 identical in design used an apparatus containing unmagnetized discs. This ensured that the same flow patterns and residence times occurred in both the test and control systems.

System 1 was substantially identical to rig 2 of Example 1 and system 2 was substantially identical to rig 1 of Example 1. The only differences were that the immersion pumps were set to provide flow rates of approximately 1400 ml/minute.

Raw milk was obtained directly from the milk line from a nearby dairy farm and was sampled before dosing. The raw milk was then dosed to provide highly contaminated milk (1000 colonies/ml). 20 liters of the contaminated test milk was added to each rig. The pumps were then started at 9.00 a.m. and each rig was run continuously to 3.00 p.m. to provide 6 hours of treatment. The duration of the trial was one day.

Milk samples (10 ml) were removed from both systems at ½ hour intervals for the first five hours and the final sample was removed at the end of the test period. Samples were collected aseptically from both the systems, before and after the apparatus, into dry, sterile bottles.

The bacterial counts are listed in Table 4.

TABLE 4

| | MILK TRIAL | |
|---|---|---|
| Sample Time | SYSTEM 1: MAGNETIZED BACTERIA Colony Forming Units/ml | SYSTEM 2: UNMAGNETIZED BACTERIA Colony Forming Units/ml |
| Bulk Milk | 106 | 106 |
| 9.00 | 1000 | 1000 |
| 9.30 | 1000 | 1000 |
| 10.00 | 1000 | 1000 |
| 10.30 | 1000 | 1000 |
| 11.00 | 1000 | 1000 |
| 11.30 | 1000 | 1000 |
| 12.00 | 1000 | 1000 |
| 12.30 | 1000 | 1000 |
| 1.00 | 1000 | 1000 |
| 1.30 | 1000 | 1000 |
| 2.00 | 1000 | 1000 |
| 3.00 | 78 | 1000 |

It can be seen from Table 4 that the bacterial colonies dropped from 1000 colonies/ml to 78 colonies/ml after six hours. For the first five hours the contamination remained high but it is believe that it was dropping for System 1 It should be noted a contamination level of above 1000 cfu/ml cannot be determined. Therefore, a level of 1000 cfu/ml may represent a significantly higher level of contamination than 1000 cfu/ml, and also, may represent a level much above that of another entry which is also at the maximum of 1000 cfu/ml.

It should be noted that this trial simulates an extreme condition that is not expected to be encountered in a dairy factory.

The microbiological results indicate that milk subjected to the magnetized apparatus had a significantly lower bacterial count than that treated in the control unit after six hours. The milk in the control (unmagnetized system) remained heavily contaminated.

It may be that for a highly contaminated milk extending the residence time of the milk within the device may achieve a faster rate of control.

EXAMPLE 3

A trial virtually identical that described in Example 2 was then conducted with whey. The results are as set out in Table 5.

TABLE 5

| | WHEY TRIAL | | | |
|---|---|---|---|---|
| | Non-Magnetized Colony Forming Units/ml | | Magnetized Colony Forming Units/ml | |
| Sample Time | Before | After | Before | After |
| Bulk | 78 | | 73 | |
| 10.00 | 92 | 112 | 57 | 12 |
| 10.30 | 102 | 96 | 49 | 26 |
| 11.00 | 90 | 135 | 40 | 22 |
| 11.30 | 165 | 138 | 16 | 13 |
| 12.00 | 60 | 70 | 29 | 9 |
| 12.30 | 80 | 134 | 35 | 16 |
| 1.00 | 55 | 56 | 41 | 30 |
| 1.30 | 140 | 102 | 35 | 17 |
| 2.00 | 94 | 88 | 39 | 23 |
| 2.30 | 114 | 78 | 23 | 17 |
| 3.00 | 60 | 57 | 25 | 18 |
| 3.30 | 68 | 60 | 31 | 22 |
| 4.00 | 44 | 55 | 18 | 11 |

Again the results show a marked drop in the number of bacteria in the liquid after it has been passed through the magnetized apparatus.

Flow rates of 1400 ml/minute were used in the tests on fuel and milk. The rate of flow may vary very widely about such figures, depending on the size of the apparatus, but must be sufficiently controlled to allow the field effect to disrupt the protistal structure and processes. It is believed that too slow a flow rate may permit at least some species of protista to so orientate themselves within each part of the apparatus during passage to minimize the disruption of the field effect. Too rapid a flow rate may permit the protista to pass an orientation most favorable for inhibition before the field effect can cause significant disruption to inhibit the cell.

Where in the aforegoing description, reference has been made to specific components or integers of the invention having known equivalents, then such equivalents are herein incorporated as if individually set forth.

Although this invention has been described by way of example, and with reference to possible embodiments, it is to be understood that such embodiments are not limiting, merely exemplary, and that modifications and improvements may be made thereto without departing from the scope or spirit of the invention.

What is claimed is:

1. A method of inhibiting protista in a fluid comprising:

providing a plurality of magnets arranged in sequence in relative spaced relationship with the north pole of at least one magnet facing the south pole of an adjacent magnet for producing a plurality of magnetic fields having field strengths up to 1,200 gauss; and causing the fluid to flow under turbulent flow conditions in a tortuous path through said plurality of magnetic fields in rapid succession for at least 1 second by passing the fluid between facing poles of adjacent magnets in succession, so that the fluid encounters magnetic fields of varying strengths and differing polarities as it flows along said path.

2. A method as claimed in claim 1 and further comprising:

subjecting said fluid to said magnetic fields for a time in the range of 1 second to 200 seconds.

3. A method as claimed in claim 2 wherein:

said fluid is subjected to said magnetic fields for a time in the range of 5 seconds to 150 seconds.

4. A method as claimed in claim 2 and further comprising:

flowing said fluid through said magnetic fields for a distance of at least 0.5 m.

5. A method as claimed in claim 2 and further comprising:

selecting said fluid from the group consisting of milk, whey, diesel fuel, gasoline, kerosene, and fluidized milk powder.

6. A method as claimed in claim 1 and further comprising:

flowing said fluid through said magnetic fields for a distance of at least 0.5 m.

7. A method as claimed in claim 6 and further comprising:

selecting said fluid from the group consisting of milk, whey, diesel fuel, gasoline, kerosene, and fluidized mil powder.

8. A method as claimed in claim 1 and further comprising:

selecting said fluid from the group consisting of milk, whey, diesel fuel, gasoline, kerosene, and fluidized milk powder.

9. A method as claimed in claim 1 wherein:

said field strengths are in the range of 20 to 200 gauss.

10. A method as claimed in claim 9 wherein:

said fluid is subjected to said magnetic fields for a time in the range of 5 seconds to 150 seconds.

11. A method as claimed in claim 10 and further comprising:

flowing said fluid through said magnetic fields for a distance of at least 0.5 m.

* * * * *